United States Patent [19]

Takano et al.

[11] 3,914,032
[45] Oct. 21, 1975

[54] DEVICE FOR OBSERVING AND PHOTOGRAPHING THE FUNDUS OF EYE

[75] Inventors: Eiichi Takano; Kunio Takesi, both of Tokyo; Isao Matsumura, Yokohama, all of Japan

[73] Assignee: Canon Kabushiki Kaisha, Tokyo, Japan

[22] Filed: Sept. 14, 1973

[21] Appl. No.: 397,363

[30] Foreign Application Priority Data
Sept. 16, 1972 Japan.............................. 47-92230

[52] U.S. Cl. ........................ 351/7; 350/189; 351/6; 354/62
[51] Int. Cl.² ...................... A61B 3/14; G02B 3/04
[58] Field of Search ........ 351/7, 6; 354/62; 350/189

[56] References Cited
UNITED STATES PATENTS

| | | | |
|---|---|---|---|
| 2,633,122 | 3/1953 | Vannas | 351/6 X |
| 3,089,398 | 5/1963 | Wilms | 351/7 X |
| 3,594,071 | 7/1971 | Okajima | 351/7 |
| 3,598,478 | 8/1971 | Townsley | 351/7 X |

*Primary Examiner*—Paul A. Sacher
*Attorney, Agent, or Firm*—Toren, McGeady and Stanger

[57] ABSTRACT

A device for observing and photographing the fundus of eye including an optical system for directly observing or photographing the fundus of the eye of a person to be inspected and an optical system for projecting the illuminating light bundle to the fundus of the eye. Both optical systems utilize one and the same objective lens commonly used therein, wherein means is provided in said objective lens for reducing the incident angle to each of the refracting surfaces of said objective lens by increasing the number of such refracting surfaces, for improving compensation for the aberrations by applying an aspherical surface to one of said refracting surfaces and for removing the reflecting light by the cornea of the eye to be inspected on the surface of a single lens constituting said objective lens, means for regulating the position, of said objective lens with respect to the eye to be inspected by said objective lens being adapted to cooperate with said first mentioned means for permitting a broad and sharp image to be obtained.

13 Claims, 3 Drawing Figures

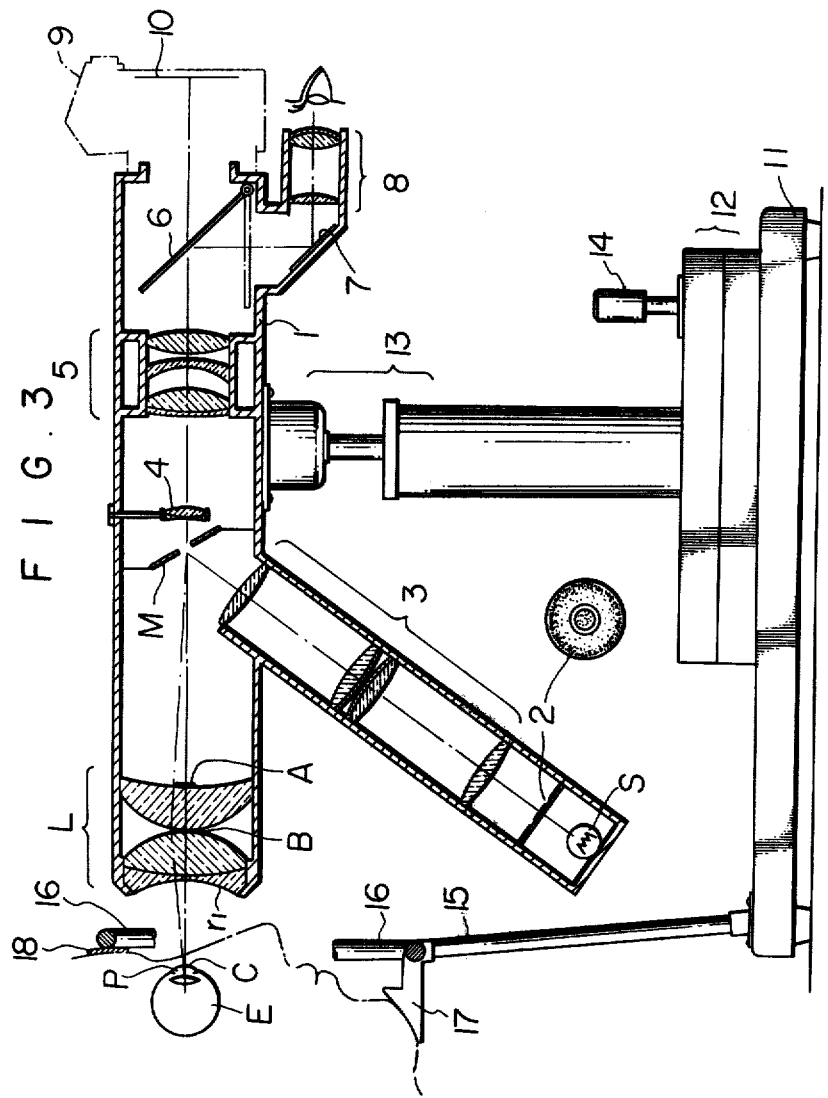

DEVICE FOR OBSERVING AND PHOTOGRAPHING THE FUNDUS OF EYE

DESCRIPTION OF THE INVENTION

The present invention is directed to a device for directly observing or photographing principally the interior of the eyeball as well as the fundus of an eye during an eye inspection.

Heretofore, an ophthalmoscope or a retinal camera has been well known which is provided with an optical system for directly observing or photographing the fundus of an eye of a person being examined and an optical system for projecting the illumination light bundle to the fundus of the eye, both of which optical systems utilize one and the same objective lens commonly used therein, the optical systems being those utilized in such a device of the type described above.

FIG. 1 shows a well known objective lens used in the optical system of the type described above, L' being the objective lens, E being the eye to be inspected, and M being a perforated mirror having an opening so located that the center of the opening is in the optical axis of the objective lens. The reflecting surface of the perforated mirror serves to direct the light bundle coming from a light source in the direction of the eye to be inspected and the area of the opening is for observing therethrough the eye being examined.

In such an objective lens L', since the radius of curvature of the first surface L$a$ is small the light rays in the region of widened angle of field in the light coming back from the eye E to be inspected form tangentially to the surface L$a$, and, therefore, the practically utilizable range of the light rays is limited to the degree of 30°. Thus, it is necessary to repeat the observations several times by readjusting the angle of the device.

Ghost images might be formed by the light bundle reflected by the surface of the cornea of the eye of the patient or by the surface of the lens element of the objective lens to lower the clearness of the image, and the quality of the image might be deteriorated mainly by the spherical aberration or other aberrations.

An object of the present invention is to make it possible to obtain a clear observation of such an image in a wide range such as the wide angle of field of 45° to 60°. By constituting the objective lens by the combination of two groups of lens components so as to share the refracting power to the respective lens components and to increase the number of refracting surfaces of the lens elements, it is possible to reduce the incident angle of the light ray to the respective refracting surfaces, and, further, by providing an aspherical surface in a portion of the lens components, it is possible to make the angle of field to be wide while the spherical aberration and other aberrations are kept well compensated.

A further object of the present invention is to remove the adverse influence of the reflecting light caused by the surface of the cornea of the eye or the surfaces of the lens elements of the objective lens on the performance of the objective lens. To this end, the objective lens is so constructed that the center of curvature of the first surface of the objective lens starting at the patient's side is made coincident with the center of the pupil of the eye, while the center of curvature of the rearmost surface of the objective lens is made coincident with the point at which the perforated reflecting mirror intersects the optical axis of the objective lens. Any refracting surface other than the first and the rearmost surfaces and having the center of curvature thereof at the side of the patient to be inspected has the radius of curvature which is equal to or less than 80% of the resultant focal length of the objective lens. Further, the above mentioned radius of curvature is, as to the aspherical surface, the radius of the maximum circle contacting tangent to the apex of the aspherical surface.

Further, a mask is provided at a position at which the mask can cut the light bundle of the illuminating light reflected by any refracting surface having the center of curvature at the side of the patient and passing through the opening of the perforated reflecting mirror, and, with respect to the light bundle reflected by any refracting surface having the center of curvature at the side of the perforated reflecting mirror, a mask is provided at a position at which an image of the perforated reflecting mirror is formed by that light bundle reflected by the above mentioned refracting surface, thereby permitting the adverse effect of the light reflected by the refracting surfaces of the objective lens to be eliminated.

DESCRIPTION OF THE DRAWINGS:

FIG. 3 is a general side view partly in section showing the embodiment of the device of the present invention.

First, the objective lens used in the device of the present invention will be described. In FIG. 2, L designates the objective lens which consists of a front group $L_1$ and a rear group $L_2$. The front group $L_1$ is of a positive meniscus which is formed by cemented lens elements or a single lens element with concave surface thereof directed toward the eye E to be inspected, while the rear group $L_2$ is a positive meniscus formed by cemented lens elements or a single lens with the concave surface thereof directed toward the perforated reflecting mirror M. C designates the cornea of the eye E.

Figure 1:
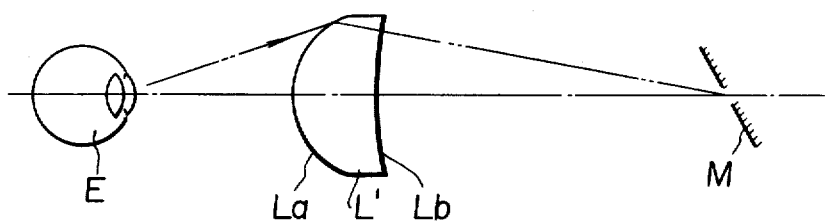
FIG. 1 is a longitudinal sectional view showing the well known prior art objective lens.

A and B are masks for cutting the light bundle reflected by the surfaces of the lens elements of the objective lens. At least a surface of the refractive surfaces of the objective lens other than the first surface and the rearmost surface thereof is made an aspherical surface so as to form an image of the center P of the pupil at the center T of the perforated reflecting mirror without any spherical aberration, and the center of curvature of the first surface is positioned so as to coincide with the center P of the pupil.

In the above mentioned objective lens L, since the center of curvature of the rearmost surface of the objective lens L is located in the opening of the perforated reflecting mirror M, the light bundle coming from the light source (to be described later) and reflected by the reflecting mirror M toward the rearmost surface of the objective lens L and again reflected thereby toward the reflecting mirror M is devoid of the light beam capable of passing through the opening of the reflecting mirror M. Therefore, the light bundle reflected by the rearmost surface of the objective lens is completely separated from the light bundle for the observation and the photographing.

Since the pupil of the eye E to be inspected and the perforated reflecting mirror M are in conjugate relationship with respect to the objective lens, and, further, since the relationship is satisfied without any spherical aberration by virtue of the provision of the aspherical surface at a portion of the objective lens, the reflection of the light by the first surface as well as the reflection of the light by the cornea of the eye is eliminated. Further, the reflecting light can be eliminated by locating masks adjacent to the respective positions of the real images, i.e., the position of the surface $r_3$ with respect to the surface $r_2$ of the surfaces $r_2$, $r_4$, by which surfaces the real images of the reflecting mirror, i.e., the real images of the ring slit described later, are formed, and the position of the surface $r_5$ with respect to the surface $r_4$. And also the reflecting light from the surface $r_3$, i.e., the surface by which the virtual image of the reflecting mirror is formed, is devoid of the portion of the light which passes through the opening of the reflecting mirror by virtue of the above mentioned mask. In order to eliminate the reflecting light from the surface by which the real image of the ring slit is formed, it suffices to provide a relatively small mask, however, in order to eliminate the reflecting light from the surface by which the virtual image is formed, it is necessary to provide a relatively large mask thereby resulting in disadvantages that the light quantity is significantly reduced so that a portion of the image is made dark. To the contrary, in accordance with the present invention, such disadvantages are avoided by making the radius of curvature of that surface (the radius of the maximum circle contacting tangentially to the apex in the case of the aspherical surface) to be equal to or less than 80% of the resultant focal length of the objective lens.

Now, an embodiment of the device of the present invention will be described with reference to FIG. 3. In the figure, 1 designates a housing. S designates a light source, 2 a ring slit, 3 a relay lens, 4 a visibility compensating lens. This visibility compensating lens is so used that appropriate one is inserted into the optical path according to the visibility of the patient to be examined in case he is near-sighted or far-sighted, and, when the patient has normal sight, the compensating lens is removed from the optical path. 5 is a relay lens. 6 is a swingable mirror which can be brought to the position shown by the solid line or the broken line by the actuation from the exterior of the device by means of a mechanism not shown. A beam-splitter may be provided in place of the swingable mirror 6. 7 designates a mirror, 8 an eyepiece. 9 is a body of a conventional single lens reflex camera, which is detachably mounted on the housing 1. However, an exposure mechanism, a film take-up mechanism, etc. may be provided integrally with the housing 1. 10 is the image plane. 11 is a base of the device, and 12 is a parallel displacement mechanism which permits the housing to be moved along the plane of the figure or perpendicular to the plane of the figure. 13 designates a mechanism for supporting the housing which permits the displacement of the housing in the upward and downward direction, the swinging movement of the housing in the direction perpendicular to the plane of the figure as well as in the upward and downward direction. The means for adjusting the optical system is constituted by elements 11, 12, 13 and 14. 14 designates a lever which is for manipulating the above mentioned housing for the movement thereof. 15 is a pole secured to the base 11, and 16 designates a pole secured to the pole 15. 17 is a jaw rest, and 18 is a forehead rest. Thus, the face of the patient is fixed by these elements 15, 16, 17 and 18, which constitute means for holding the eye E to be inspected at a determined position. C designates the cornea of the eye, and P designates the center of the pupil.

With the device as described above, the face of the patient is brought to rest on the jaw rest 17 and the forehead rest 18 so as to hold the eye E to be inspected at the determined position.

Then, the light source S is energized. The annular light bundle passing through the ring slit 2 is focused at a position adjacent to the perforated reflecting mirror M. The size of the image of the light bundle is somewhat greater than the size of the opening of the mirror M. The light bundle reflected by the mirror M and turning the direction of advancement thereof illuminates the eye E to be inspected through the objective lens L. The swingable mirror 6 is fixed at the position shown by the solid line, and the inspector such as a physician makes adjustment of the observation optical system while he is observing the eye E through the eyepiece 8.

This adjustment is carried out by manipulating the lever 14 so as to actuate means 11, 12, 13 for adjusting the optical system. The optical axis of the objective lens L is adjusted so as to pass through the center P while the center of curvature of the first surface $r_1$ is made coincident with the center P.

By making the radius of curvature of the first surface $r_1$ coincident with the working distance of the observation optical system, remarkable improvement is obtained in eliminating the ghost effect.

The light bundle illuminating the eye E to be inspected is reflected by the fundus of the eye and emanates from the cornea through the pupil and refracted by the objective lens to pass therethrough and passes through the opening of the mirror M and is observed by the inspector through the relay lens 5 and the eyepiece 8. When the mirror 6 is fixed to the position shown by the broken line, the object is photographed.

Figure 2:
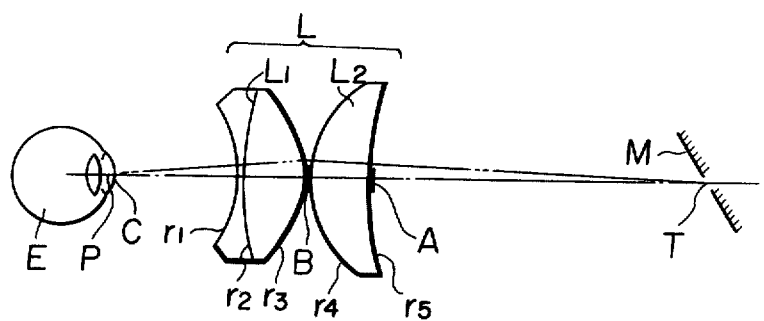
FIG. 2 is a longitudinal sectional view showing an embodiment of the objective lens used in the device of the present invention.

Now, the example of the numerical data of the objective lens of the present invention is shown below with reference to FIG. 2.

Resultant focal length of the object lens L: 40.18
Projection magnification by the objective lens L in the range from the pupil to the reflecting mirror M : 0.5X
Size of the ring slit 2 : Circular ring having the outer diameter of 15mm and the inner diameter of 9mm.
Projection magnification of the ring slit by the condenser lens 3 : 1X
r : radius of curvature each of the refracting surfaces starting at the side of the eye, where $r_3$ is the radius of the maximum circle contacting tangentially with the apex of the aspherical surface.
d : thickness of the lens elements or the air gap measured along the optical axis starting at the side of the eye.
N : refractive index each of the glasses forming the respective lens elements starting at the side of the eye.
$s_1$ : distance between the surface $r_1$ and the pupil of the eye to be inspected.
$s_2$ : distance between the surface $r_5$ and the reflecting mirror.

$$r_1 = \begin{array}{l} s_1 = 40.49 \\ -40.97 \\ d_1 = 1.6 \\ \end{array} \quad N_1 = 1.7552$$
$$r_2 = 113.11$$

-Continued

| | | |
|---|---|---|
| | $d_2 = 21.4$ | $N_2 = 1.51633$ |
| $r_3 =$ | −20.86 | |
| | $d_3 = 0.2$ | |
| $r_4 =$ | 38.22 | |
| | $d_4 = 21.1$ | $N_3 = 1.49831$ |
| $r_5 =$ | 115.04 | |
| | $s_2 = 115.04$ | |

Relationship in the size and position of masks

| Reflecting surface | Kind of reflected image | Position of mask | Dia. of mask (mm) | Dia. of photograph'g light bundle (assuming to be 2.5mm at the pupil) | Reduction in* photograph'g light bundle due to mask (%) |
|---|---|---|---|---|---|
| $r_2$ | Real image | $r_3$ | 0.8 | 3.2 | 6.3 |
| $r_3$ | Virtual image | $r_3$ | 1.64 | 3.2 | 2.5 |
| $r_4$ | Real image | $r_5$ | 0.6 | 2.2 | 7.4 |

$$*\frac{(\text{Dia. of Mask})^2}{(\text{Dia. of photograph'g light bundle})^2} \times 100$$

What is claimed is:

1. A device for observing and photographing the retina of a human eye comprising:

positioning means for fixedly establishing the position of the eye to be examined, a fundus inspection optical system comprising an objective lens having an optical axis, a reflecting means obliquely provided on said optical axis of said objective lens and an observing optical system for observing and photographing the retina of the eye being examined, said observing optical system being provided on said optical axis of said objective lens, and an illuminating optical system having an optical axis crossing with said optical axis of said objective lens and comprising a light source and a projection lens group, wherein the light from said illuminating optical system is reflected at said reflecting means to the eye through said objective lens, said objective lens comprising a front lens group and a rear lens group said front lens group being closer to the eye and said rear lens group being closer to said observing optical system, the surface of the front lens group having the greatest power being convex towards said observation side and the surface of the rear lens group having the greatest power being convex towards the eye being examined, and means for supporting the fundus inspection optical system and for adjusting the position thereof, both of said lens groups being positioned along the axis closer to the position at which the positioning means places the eye.

2. A device for observing and photographing the retina of the human eye according to claim 1, wherein the front lens group forms a concave front surface facing said eye and a convex rear surface facing the observing optical system, the rear lens group having rear convex surface facing said observing optical system,, said reflecting means having one perforation at a portion where it crosses the optical axis of said fundus inspection optical system, the center of curvature of said front surface of said front lens group matching the center of the pupil of said eye, the center of curvature of said rear plane of said rear lens group matching the center of said perforation of said reflecting means.

3. A device for observing and photographing the retina of a human eye according to claim 2, further comprising a light shielding means for eliminating undesired light and being provided at the portion where said optical axis of said fundus inspection optical system crosses one of said rear surfaces.

4. A device for observing and photographing the fundus of the eye according to claim 1, wherein said objective lens includes refracting surfaces and a surface of the refracting surfaces comprises an aspherical surface.

5. A device for observing and photographing the fundus of the eye according to claim 4, wherein the radius of curvature of said refracting surfaces of said objective lens are equal to no more than 80% of the resultant focal length of said objective lens.

6. A device as in claim 3, wherein said light shielding means includes a mask located at the rear surface of said front lens group.

7. A device as in claim 3, wherein said light shielding means includes a mask located at the rear surface of said rear lens group.

8. A device as in claim 3, wherein said light shielding means are located to shield light at each of said rear surfaces.

9. A device for observing the retina of a human eye, comprising an objective lens forming a path of light, an observing lens in the path of light from the objective lens, illuminating means for projecting light across the path of light, reflecting means between the objective lens and the observing lens located to direct light from the illuminating means toward the objective lens, said reflecting means being formed and located to permit at least a portion of the light from the objective lens to bypass the reflecting means, said objective lens comprising a front lens group directed outwardly from the objective lens and a rear lens group positioned closer to the observing lens, said front lens group having a front surface with a center of curvature located beyond the end of the objective lens away from the observing lens, said objective lens having a non-spherical surface.

10. An apparatus as in claim 9, wherein the surface of the front lens group having the greatest power is convex toward the observing lens and the surface of the rear lens group having the greatest power is convex toward the eye being examined, and wherein means support the lenses and illuminating means for adjusting the position thereof.

11. An apparatus as in claim 9, wherein the means for allowing the reflecting means to bypass a portion of light from the objective lens includes a perforation in the reflecting means, said rear lens group having a rear plane with a center of curvature matching the center of the perforation of said reflecting means.

12. An apparatus as in claim 11, wherein said objective lens includes a rear surface and a plurality of surfaces between the front surface and the rear surface, said aspherical surface being one of the plurality of surfaces between the front and rear surface.

13. An apparatus as in claim 9, wherein support means support the objective lens and the observing lens as well as the reflecting means and the illuminating system, said support means providing means for supporting the face having the human eye to be observed, said supporting means supporting the objective lens so that the center of curvature of said front surface of said front lens group can match the center of the pupil of the eye being observed.

* * * * *